(12) United States Patent
Black et al.

(10) Patent No.: US 7,398,266 B2
(45) Date of Patent: *Jul. 8, 2008

(54) DYNAMICALLY CATEGORIZING ENTITY INFORMATION

(75) Inventors: Jeffery Dean Black, Laural, MD (US);
Jason Harvey Titus, Alexandria, VA (US); Ira Joseph Woodhead, Alexandria, VA (US)

(73) Assignee: Overture Services, Inc., Pasadena, CA (US)

( * ) Notice: Subject to any disclaimer, the term of this patent is extended or adjusted under 35 U.S.C. 154(b) by 227 days.

This patent is subject to a terminal disclaimer.

(21) Appl. No.: 10/693,667

(22) Filed: Oct. 24, 2003

(65) Prior Publication Data

US 2004/0267727 A1 Dec. 30, 2004

Related U.S. Application Data

(63) Continuation of application No. 09/374,175, filed on Aug. 13, 1999, now Pat. No. 6,654,813.

(60) Provisional application No. 60/097,029, filed on Aug. 17, 1998.

(51) Int. Cl.
*G06F 7/00* (2006.01)
*G06F 7/30* (2006.01)

(52) U.S. Cl. .................................. 707/3; 707/4; 707/5

(58) Field of Classification Search ................... 707/3; 709/217, 223, 245; 714/47
See application file for complete search history.

(56) References Cited

U.S. PATENT DOCUMENTS

| 5,905,862 | A |   | 5/1999  | Hoekstra ..................... 709/202 |
| 5,933,827 | A |   | 8/1999  | Cole et al. ...................... 707/4 |
| 5,958,008 | A | * | 9/1999  | Pogrebisky et al. ......... 709/223 |
| 5,974,455 | A |   | 10/1999 | Monier ........................ 709/217 |
| 5,974,572 | A | * | 10/1999 | Weinberg et al. ............. 714/47 |
| 6,085,229 | A |   | 7/2000  | Newman et al. ............ 709/203 |
| 6,119,135 | A |   | 9/2000  | Helfman ...................... 715/513 |
| 6,141,759 | A |   | 10/2000 | Braddy ......................... 726/14 |
| 6,151,624 | A | * | 11/2000 | Teare et al. .................. 709/217 |
| 6,195,657 | B1 |  | 2/2001  | Rucker et al. ................... 707/5 |
| 6,401,118 | B1 |  | 6/2002  | Thomas ....................... 709/224 |
| 6,654,813 | B1 | * | 11/2003 | Black et al. ................. 709/245 |
| 6,735,585 | B1 | * | 5/2004  | Black et al. ..................... 707/3 |

FOREIGN PATENT DOCUMENTS

WO WO 97/15018 4/1997
WO WO 97/29414 8/1997

* cited by examiner

*Primary Examiner*—Apu Mofiz
*Assistant Examiner*—Te Chen
(74) *Attorney, Agent, or Firm*—Dreier LLP; Seth H. Ostrow (57) ABSTRACT

A set of criteria is acquired that defines a category of entities. The set of criteria is dynamically applied to identify an entity that meets the criteria. It is determined that the entity is registered as having control over at least a portion of a World-Wide Web address. The at least a portion of a World-Wide Web address is associated with the entity in a presentation that indicates that the entity belongs to the category of entities. In the presentation, a link may be included to a set of computer data about the entity. The set of computer data includes information other than information provided at a World-Wide Web site corresponding to the World-Wide Web address.

16 Claims, 12 Drawing Sheets

ANY CITY ▶ | SEARCH |

Categories

Websites

▲ ☐ Apparel
▲ ☐ Arts & Entertainment
▲ ☐ Auto
▲ ☐ Business & Economy
▲ ☐ Community
▲ ☐ Computers & Electronics
▲ ☐ Dining & Entertainment
▲ ☐ Health
▲ ☐ Goverment
▲ ☐ Home & Real Estate
▲ ☐ Hotels and Travel
▲ ☐ Money & Law
▲ ☐ Shops and Services
▲ ☐ Sports & Recreation
▲ ☐ Travel & Transportation The UrlBot allows you to find websites of companies based on their area(s) of business.

To begin, select a category from the list on the left. A list of websites matching the selected category will be displayed along with a list of subcategories. To narrow your search, click on a subcategory until you've found exactly what yuo're looking for. Happy hunting!

UrlBot

| Data Element |
|---|
| Company Information(s) |
| Company Name |
| Subsidiary Parent Number |
| Ultimate Parent Number |
| Incorporated as (Company Type) |
| Incorporated in (State) |
| Incorporation Date |
| Years in Business |
| Public Co. Indicator (1) |
| Stock Exchange Code |
| Stock Ticker Symbol |
| Fortune Ranking |
| Stock Price Link |
| News Articles Link |
| Press Release Link |
| Annual Report Link |
| Patents |
| Company Logo |
| Trademarks |
| Physical Location |
| Address |
| City (16) |
| State Abbreviation |
| Zip Code |
| Zip+4 |
| Phone |
| Fax Phone |
| Carrier Route |
| State Numeric Code |
| County |
| MSA Code |
| Country |
| Latitudes / Longitudes |
| Secondary Address |
| Secondary City |
| Secondary State |
| Secondary Zip Code |
| Number of Locations |
| Industry Information |
| Selected SIC Code |
| Franchise Codes |
| Primary sic |
| Secondary SIC Code #1 |
| Secondary SIC Code #2 |
| Secondary SIC Code #3 |
| Secondary SIC Code #4 |
| Additional Industry Codes |

FIG. 8

| Data Element |
|---|
| Contact Information |
| Key Executive |
| Contact Last Name |
| Contact First Name |
| Professional Title |
| Title Code |
| Contact Gender Code |
| Admin Contact |
| Admin Contact Email |
| Sales Contact Names (1-20) |
| Marketing Contact Names (1-20) |
| Marketing Blind E-Mail Addresses (1-5) |
| Customer Service Names (1-5) |
| Customer Service Email Addresses (1-5) |
| Investor Relations Name |
| Investor Relations E-Mail Address |
| Purchasing Contact Names (1-5) |
| Purchasing Email Address (1-5) |
| H/R Name |
| H/R E-Mail |
| Executive Names (1-20) |
| Executive Title (1-20) |
| Executive E-Mail (1-20) |
| Marketing Information |
| Ad Size |
| Population Code |
| Advertise on Web |
| Third Party Database Information |
| Individual Firm Code |
| Year of First Appearance |
| Date Added to Database |
| Production Date (MMDDYY) |
| Third Party Number |
| Key Code |
| Business Demographics |
| Employee Size Code |
| Sales Volume Code |
| Industry Specific Code |
| Business Status Code |
| Office Size Code |
| Total Employee Size Code |
| Total Output/Sales Code |

FIG. 9a iAtlas Database Information
- iAtlas Number
- Year of First Appearance
- Date Added to Database

Internet Services
- ISP Number
- ISP Name
- Primary Domain Name
- Secondary Domain Name (S) 1-100
- Domain Web Servers
- Domain Web Server Page Count
- Hosted Indicator

Internet Demographics
- Popularity
- Director
- MPEG video
- NetShow
- Quicktime MOvie
- RealAudio
- RealMedia
- Shockwave

Sales Information
- E-Commerce Enabled
- Certified
- Hours of Operation
- Brands Carried (1-N)
- Products Carried (1-N)
- Current Promotions (1-N)
- Delivery Available
- Payment Accepted
- Language Preference

FIG. 9b

| CATEGORY CODE | CATEGORY TITLE - CONSUMER | SIC CODES |
|---|---|---|
| AP | Apparel | |
| APAC | Accessories | 5661,5999,5699,5630 |
| APAC01 | Boots & Shoes | 566103,566101 |
| APAC02 | Cosmetics & Perfumes | 599992 |
| APAC03 | Hair & Wigs | 569928,569909 |
| APAC04 | Handbags | 563207 |
| APAC05 | Hats | 569927 |
| APAC06 | Swimwear | 569915 |
| APWC | Women's Clothing | 5621,5651,5699,5632 |
| APWC01 | Women's Clothing | 562101,565101 |
| APWC02 | Boutique Items | 562105 |
| APWC03 | Bridal Shops | 562104 |
| APWC04 | Wedding Supplies & Services | 599940 |
| APWC05 | Dressmakers | 569906 |
| APWC06 | Fur Business | 563202 |
| APWC07 | Lingerie | 563210 |
| APWC08 | Maternity Apparel | 562103 |
| APMC | Men's Clothing | 5611,5651,5699 |
| APMC01 | Men's Clothing | 561101,565101 |
| APMC02 | Formal Wear | 729908 |
| APMC03 | Tailors | 569919 |
| APMC04 | Tuxedos | 561112 |
| APSC | Misc. Clothing | 5699,5311,5611 |
| APSC01 | Alterations | 569932 |
| APSC02 | Department Stores | 531102 |
| APSC03 | Fashion Designers | 569901 |
| APSC04 | Leather Clothing | 561107 |
| APSC05 | Sportswear | 569913 |
| APSC06 | T-Shirts | 569917 |
| APSC07 | Uniforms | 569922 |
| APSC08 | Western Apparel | 569907 |
| APCU | Costumes and Used Clothing | 5611,5699,5932 |
| APCU01 | Army & Navy Goods | 561104 |
| APCU02 | Costumes | 569905 |
| APCU03 | Surplus & Salvage Merchandise | 561102 |
| APCU04 | Used Clothing | 593205 |
| APJE | Jewelry | 5944,7631,7631 |
| APJE01 | Diamonds | 594404 |

FIG. 10a

| CATEGORY CODE | CATEGORY TITLE - CONSUMER | SIC CODES |
|---|---|---|
| APJE02 | Gold, Silver & Platinum Dealers | 594441 |
| APJE03 | Jewelry Stores | 594409 |
| APJE04 | Jewelry Repair | 763101 |
| APJE05 | Watch Dealers | 594403 |
| APJE06 | Watch & Clock Repair | 763102,763103 |
| APJE07 | Jewelry Designers | 594408 |
| AE | Arts & Entertainment | |
| AEAT | Arts | 5999,7336,8999,8299,7396 |
| AEAT01 | Art Galleries & dealers | 599969 |
| AEAT02 | Commercial Artists | 733604 |
| AEAT03 | Fine Arts (artists) | 899912 |
| AEAT04 | Artist Materials & Supplies | 599965 |
| AEAT05 | Art Instruction | 829919 |
| AEAT06 | Sculptors | 899907 |
| AEAT07 | Art Restoration | 899908 |
| AEAT08 | Artists Agents | 738914 |
| AEMU | Music | 5736,8299,7699,5736,7929, 2741,3931,7359,5932,7389 |
| AEMU01 | Musical Instruments Dealers | 573608 |
| AEMU02 | Instrumental Music Instruction | 829918 |
| AEMU03 | Instrument Repair | 769969 |
| AEMU04 | Music Dealers | 573609 |
| AEMU05 | Musicians | 792906 |
| AEMU06 | Music Publishers | 274104 |
| AEMU07 | Instrument Manufacturers | 393102 |
| AEMU08 | Instrument Rental | 735936 |
| AEMU09 | Used Instrument | 593212 |
| AEMU10 | Recording Studios | 738947 |
| AENP | News & Publishers | 2741,2711,2731,2721 |
| AENP01 | Publishers | 274105 |
| AENP02 | Newspaper Publishers | 271101 |
| AENP03 | Book Publishers | 273101 |
| AENP04 | Peridical Publishers | 272102 |
| AENP05 | Magazine Publishers | 272101 |
| AEMR | Movies & Radio | |
| AEMR01 | Motion Picture Producers & Studios | 781205 |
| AEMR02 | Video Tapes Discs & Cassettes | 573502 |
| AEMR03 | Video Production & Taping Service | 781211 |
| AEMR04 | Radio Stations & Broadcasting Companies | 483201 |

FIG. 10b

DYNAMICALLY CATEGORIZING ENTITY INFORMATION

CROSS-REFERENCE TO RELATED APPLICATIONS

This application is a continuation application of Ser. No. 09/374,175 filed Aug. 13, 1999, now U.S. Pat. No. 6,654,813, for which a Notice of Allowance has issued.

This application claims the benefit of U.S. Provisional Application Ser. No. 60/097,029 entitled "Collecting, Combining, Analyzing, and Using Internet and Business Information" filed on Aug. 17, 1998, which is incorporated herein.

BACKGROUND OF THE INVENTION

This application relates to dynamically categorizing entity information.

On the World-Wide Web ("Web"), services known as Internet or Web portals provide hierarchical directories of Web sites. The hierarchical directories include, in Web pages organized by categories, links to Web sites and home pages that are under the control of entities such as businesses. Typically, both the creation of the categories and the assignment of Web sites to the categories are performed with substantial human input, as are any changes to the categories and assignments. For example, after a medical category is created for medical entities such as hospitals, a human searches for hospitals that have Web sites and then assigns the Web sites to the medical category. In such a case, if the medical category is then broken up into multiple subcategories such as a small hospitals subcategory and a large hospitals subcategory, a human must reassign the hospital Web sites to the proper subcategories, by determining which hospitals qualify as small hospitals and large hospitals and reassigning each of the corresponding hospital Web sites accordingly.

Much of the information available on Web sites is organized into Web pages that can be retrieved and displayed by Web browser software under the direction of a user. Each of the Web pages is identifiable by a respective Uniform Resource Locator text string ("URL"), such as "http://www.isp321.com/frontpage.html", that the Web browser software can use to select the page. Each URL includes a domain name, such as "isp321.com", that identifies the Web site where the corresponding Web page is stored for retrieval by Web browser software. Each domain name is registered by an entity that controls the corresponding Web site and Web pages. A domain name registry organization maintains the domain name registration information, which may include name, address, and other information that allows the organization to bill the entity for payment for the maintenance. (It is to be understood that the term "registry", as used herein, also refers to a domain name registrar or any other entity that may provide assistance in registering a domain name.)

An Internet service provider ("ISP") is an example of an entity that may have a registered domain name for a Web site. Typically, an ISP has customers such as individuals or businesses for whom the ISP stores Web pages on the Web site for retrieval by Web browser software. For example, the ISP may have a customer Maple Street Plumbing for which the ISP stores a home Web page having a URL that includes a prefix "http://www.isp321.com/~maplestplumb". A home Web page is typically the only or the primary entry point into a Web site or a set of Web pages that are under the control of an entity.

A Web portal is another example of an entity that may have a registered domain name. Typically, a Web portal site allows another entity to create a link from the Web portal site to the other entity's Web site or home page by submitting information to the Web portal site.

Some information about an entity may not be available on a Web site that is under the control of the entity. For example, public financial information about a company may be stored in a database that is not linked to the company's Web site or is not directly accessible by Web browser software, such as a database under the control of a financial services firm.

SUMMARY OF THE INVENTION

A method and a system are provided that allow categorized directories of Web sites to be created, maintained, and reconfigured easily without excessive human intervention, and that allow the Web sites listed in the categorized directories to be associated with links to additional information about the respective entities that have control over the Web sites. A set of criteria (such as geographical location or corresponding standard industry code) is acquired, from a user or elsewhere, that defines a category of entities. The set of criteria is dynamically applied, to a source such as an entity information database, to identify an entity that meets the criteria. It is determined, from a domain name registration organization or an ISP or elsewhere, that the entity is registered as having control over at least a portion of a World-Wide Web address. The at least a portion of a World-Wide Web address is associated with the entity in a presentation, such as a Web page, that indicates that the entity meets the set of criteria (that is, it belongs to the category of entities). In the presentation, a link may be included to a set of computer data about the entity, such as information about the entity in the entity information database. The set of computer data includes information other than information provided at the World-Wide Web address.

Other features and advantages will become apparent from the following description, including the drawings, and from the claims.

DETAILED DESCRIPTION

Figure 1:
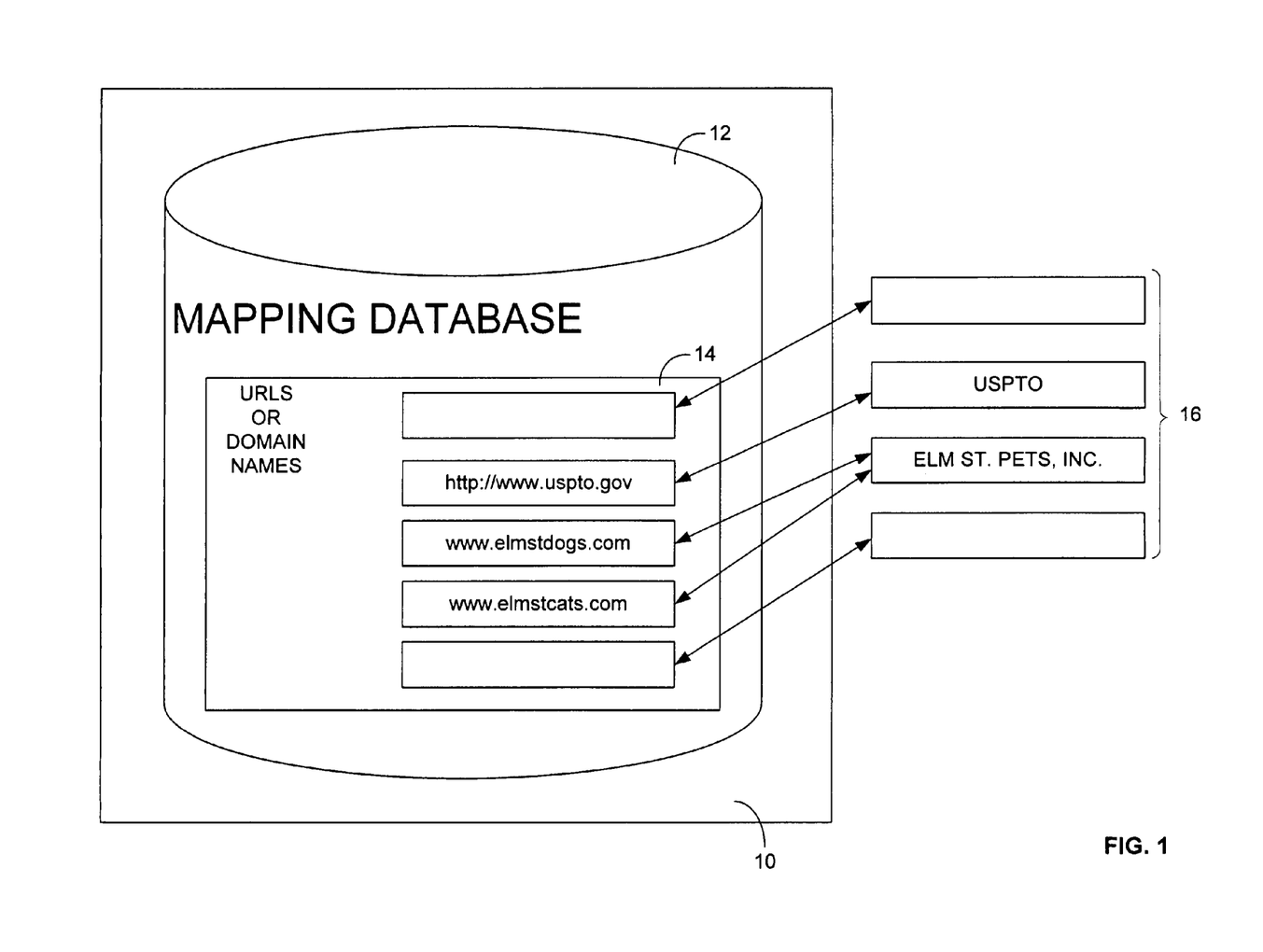
FIGS. 1-4 are block diagrams of computer-based systems.

FIG. 1 illustrates a computer system 10 in which a mapping database 12 maps URLs or domain names 14 to entities 16 such as people, businesses, or government agencies, as described in more detail below. For example, the mapping database may indicate that any URL that begins with "http://www.uspto.gov" is for a Web page controlled by the U.S. Patent and Trademark Office, or that domain names "elmstdogs.com" and "elmstcats.com" are under the control of a company named Elm Street Pets, Inc.

Numerous applications, such as the directory application described below, can take advantage of the mapping database.

Figure 2:
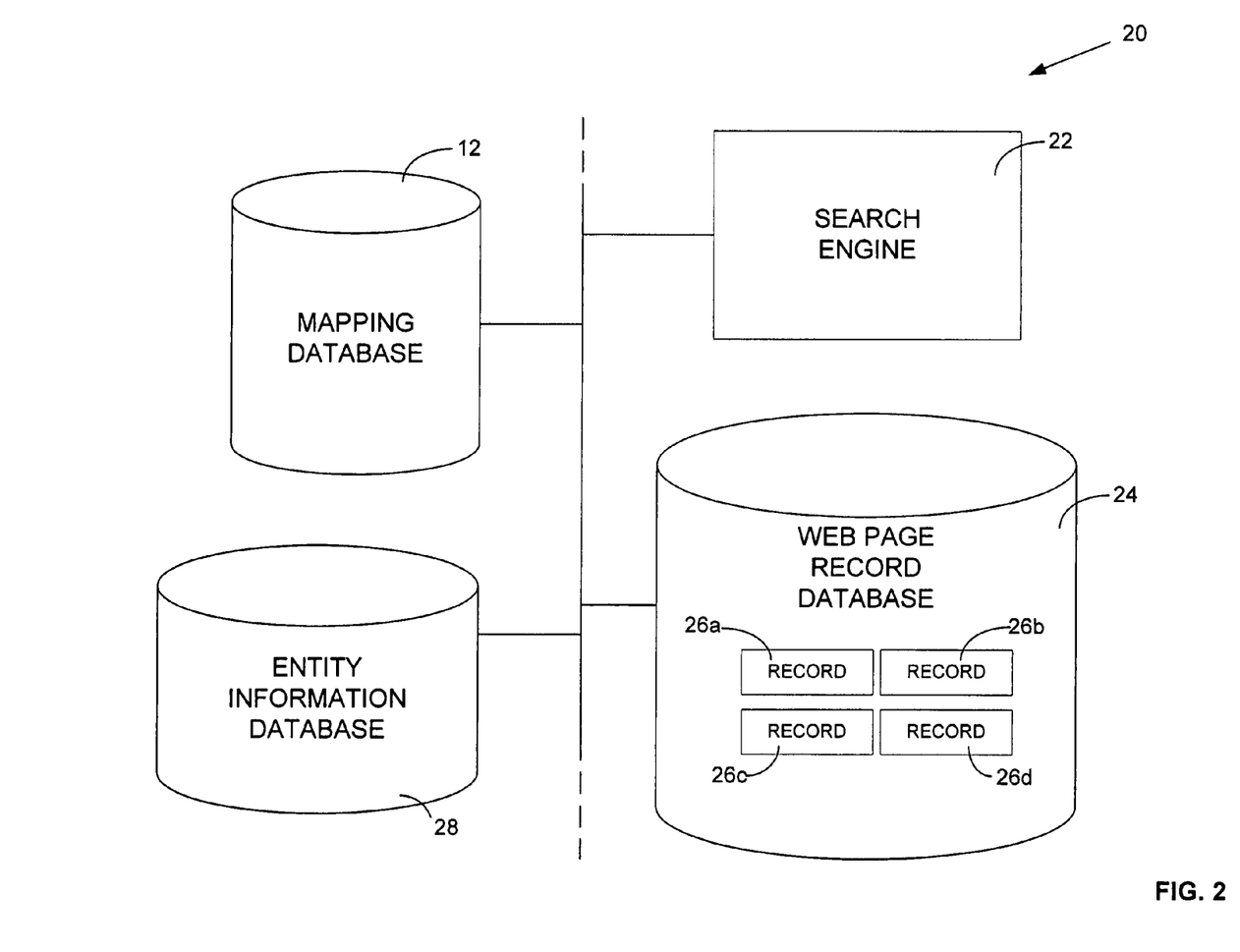

FIG. 2 illustrates a computer system 20 having the mapping database, a search engine 22, a Web page record database 24 that includes Web page records 26a-26d, and an entity information database 28 (also known as a business data database) that includes information such as geographic information about entities to which URLs or domain names are mapped in the mapping database.

The mapping database may use a unique identification number ("unique ID"), such as a 9-digit American Business Information ("ABI") number, to identify an entity so that other information about the entity can be retrieved from the entity information database or elsewhere by searching under the unique ID. (ABI numbers are sponsored by infoUSA.) For example, unique IDs from the mapping database may be used to search the entity information database to produce a subset of the mapping database that has records only for entities having a particular characteristic, such as hospitals having a particular geographic location or more than 1000 employees.

Where an entity constitutes a portion of another entity, each of the entities may be assigned different unique IDs, and the different unique IDs may be linked in the mapping database to note the relationship among the entities. For example, a company that has offices in different locations may be assigned a unique ID for the company itself and a respective different unique ID for each location. In another example, when two previously unrelated companies merge or one is acquired by the other, each may retain its unique ID and a new, different unique ID may be assigned to the combination of the two companies, or both companies may be assigned the same unique ID.

In the entity information database, each entity may be associated with standard industry code ("SIC") fields for SIC numbers that indicate the industry categories for the entity. Each SIC field may be arranged to hold a number having sections to indicate broad and narrow industry categories. For example, the SIC field may hold an SIC number having six digits, of which the first two digits may indicate a broad industry category such as "service companies", the second two digits may indicate "computer service companies" as a subcategory of "service companies", and the third two digits may indicate "manufacturer computer service companies" as a subcategory of "computer service companies". As a result, the entity information database can be searched by industry categories or subcategories represented by SIC numbers.

Information in the mapping database may be derived from information submitted by or on behalf of the entity when a domain name is registered. For example, when the company Elm Street Pets, Inc. registers the domain names "elmstdogs.com" and "elmstcats.com" with a domain name registry, the company associates the domain names with at least enough information, such as name, address, and telephone number information, to allow the domain name registry to bill the company for maintenance of the registration.

The entity may submit information to the mapping database in other ways such as in an on-line questionnaire that feeds the mapping database.

Information in the mapping database may be derived from information provided by an intermediary such as an ISP or an Internet portal. For example, an ISP having a domain name "isp321.com" may have a customer Maple Street Plumbing for which the ISP hosts and administers a home page having a home page address "www.isp321.com/~maplestplumb". In such a case, the ISP may have name, address, and telephone number information for the purpose of billing Maple Street Plumbing for such hosting and administration, and may allow such information along with the home page address to be used to link the home page address to Maple Street Plumbing in the mapping database.

In another example, an Internet portal may allow an entity such as Maple Street Plumbing to create an entry or listing named "Maple Street Plumbing" in a "plumbing" section of a on-line directory maintained by the portal, to allow a user to view home page "www.isp321.com/~maplestplumb" by selecting the entry. In such a case, the Internet portal may allow information in the entry, and perhaps any address and telephone number information submitted by the entity during creation of the entry, to be used to link the home page to Maple Street Plumbing in the mapping database.

The mapping database and applications based on the mapping database may take advantage of a hierarchical organization of Web pages, by treating similarly a mapped page and all pages below the mapped page, such as pages sharing a particular prefix with the mapped page. For example, all pages sharing the prefix "www.isp321.com" may be treated as being under the control of an ISP named Global ISP Co. Since such pages include pages sharing the prefix "www.isp321.com~maplestplumb", which should be treated as being under the control of Maple Street Plumbing, execution of a unique ID tagging procedure for Global ISP Co. should be followed by execution of a unique ID tagging procedure for Maple Street Plumbing so that tags referring to Global ISP Co. are changed to tags referring to Maple Street Plumbing where appropriate.

The mapping database may map an entity to Web pages maintained at different Web sites. For example, Maple Street Plumbing may have a first set of Web pages at the Global ISP Co. site and a second set of Web pages at another ISP's site.

The entity information database may include a database such as EDGAR® online that includes information about companies. Information derived from EDGAR® online may be used to allow a search of the entity information database to be limited to companies that match a specified financial profile, such as profitable companies.

Information in the mapping database or the entity information database may allow searches to be limited by relative size of entities, such as size in an industry.

One or more of the databases referenced above may be or include a relational database and may have records to which fields may be added readily to accept informational tags and Web link information.

Figure 3:
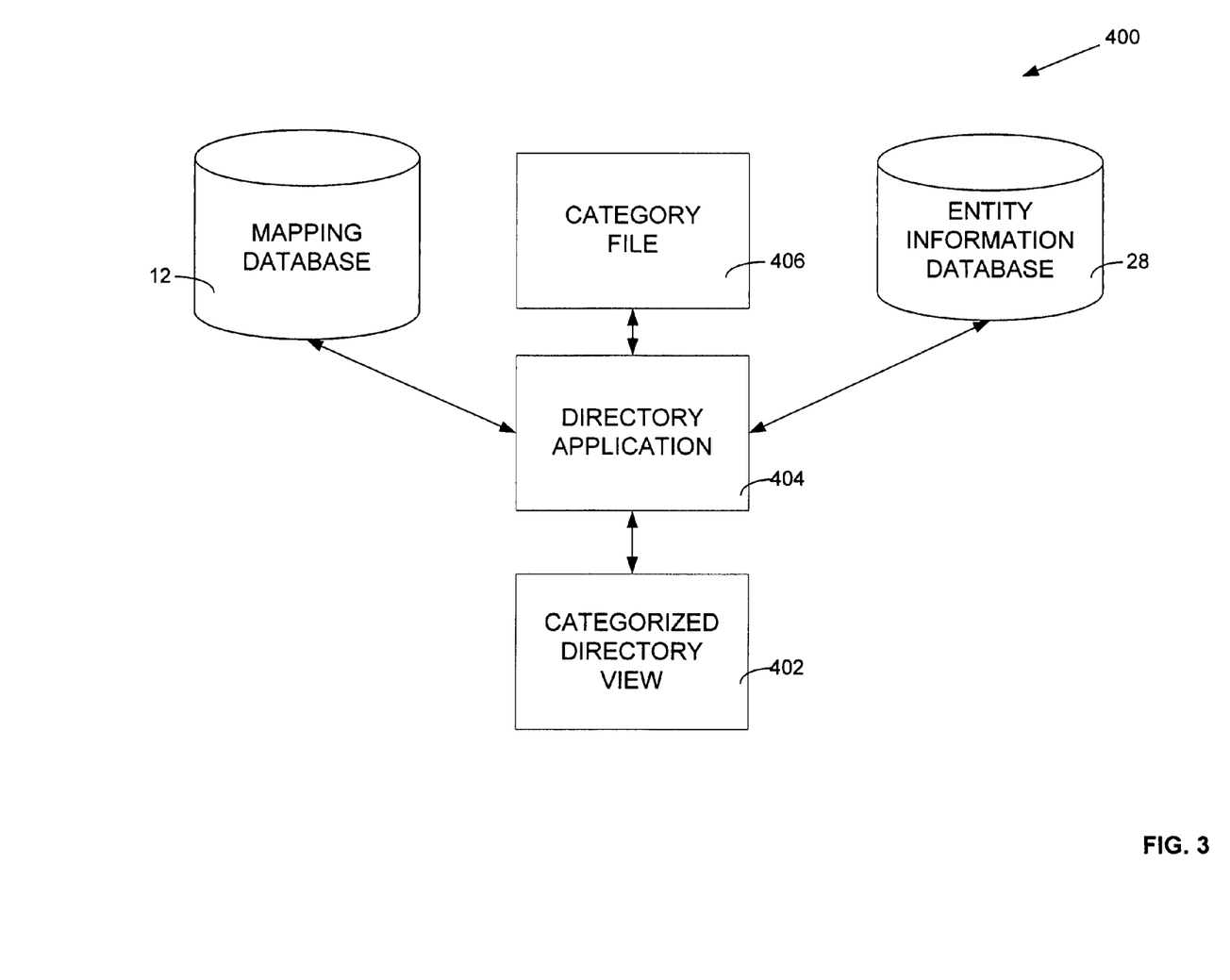

FIG. 3 illustrates an example of a directory application system 400 in which information drawn from the mapping database 12 and the entity information database 28 is used to produce a categorized directory view 402 of entities and Web sites that are under the control of the entities. The entity information database has information about attributes of each entity, such as the entity's location, a SIC code for the entity, and the size of the entity by the number of employees. In the categorized directory view, the entities and the Web sites under the control of the entities are grouped according to one or more of the attributes. For example, the grouping may be according to subject matter areas identified by SIC codes, or according to business status such as privately-held, public, or not-for-profit.

In at least the case of an example embodiment 500 described below, a directory application 404 draws information from the mapping database and the entity information database at the time a categorized directory view is produced, so that the information presented in the view is as current as the information in the mapping and entity information databases. The example embodiment described below also provides a highly data storage space efficient implementation that does not require an intermediate database of directory contents; the directory application relies on a category file 406 that defines the categorical structure, but not the contents, of the view.

Figure 4:
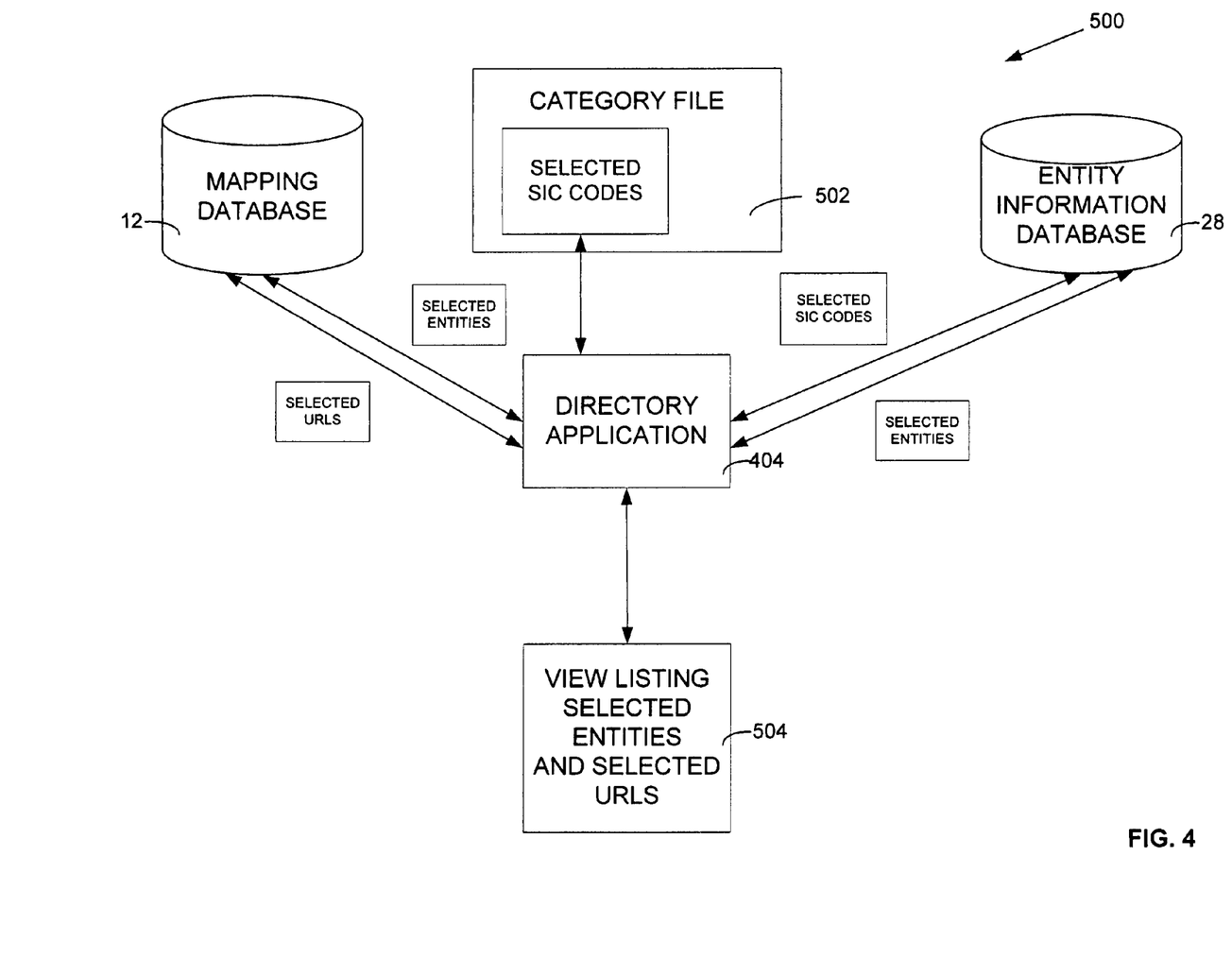
Figure 5:
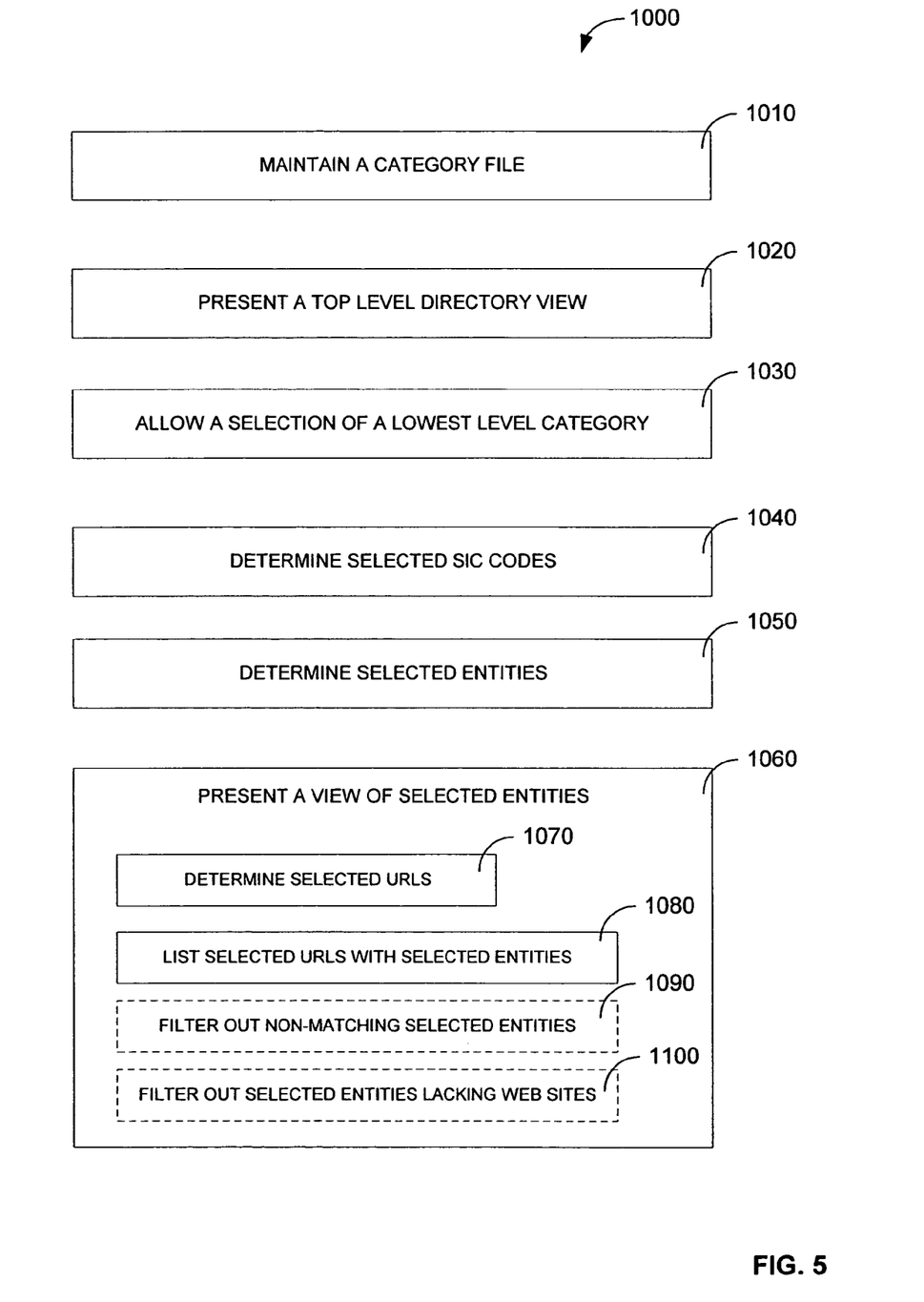
FIG. 5 is a flow diagram of a computer-based procedure.
Figure 10A:
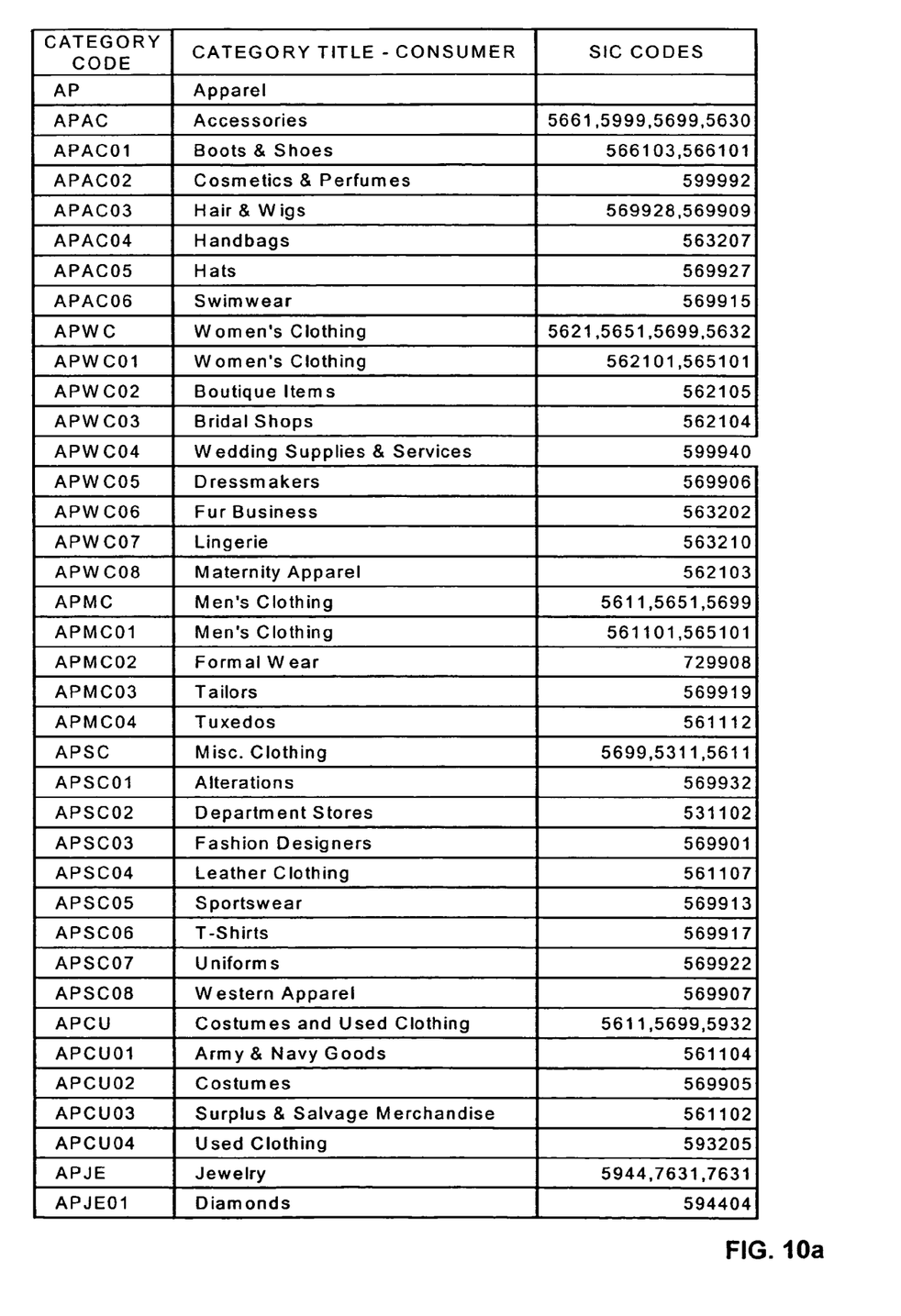
FIG. 10 is an illustration of computer file information.
Figure 10B:
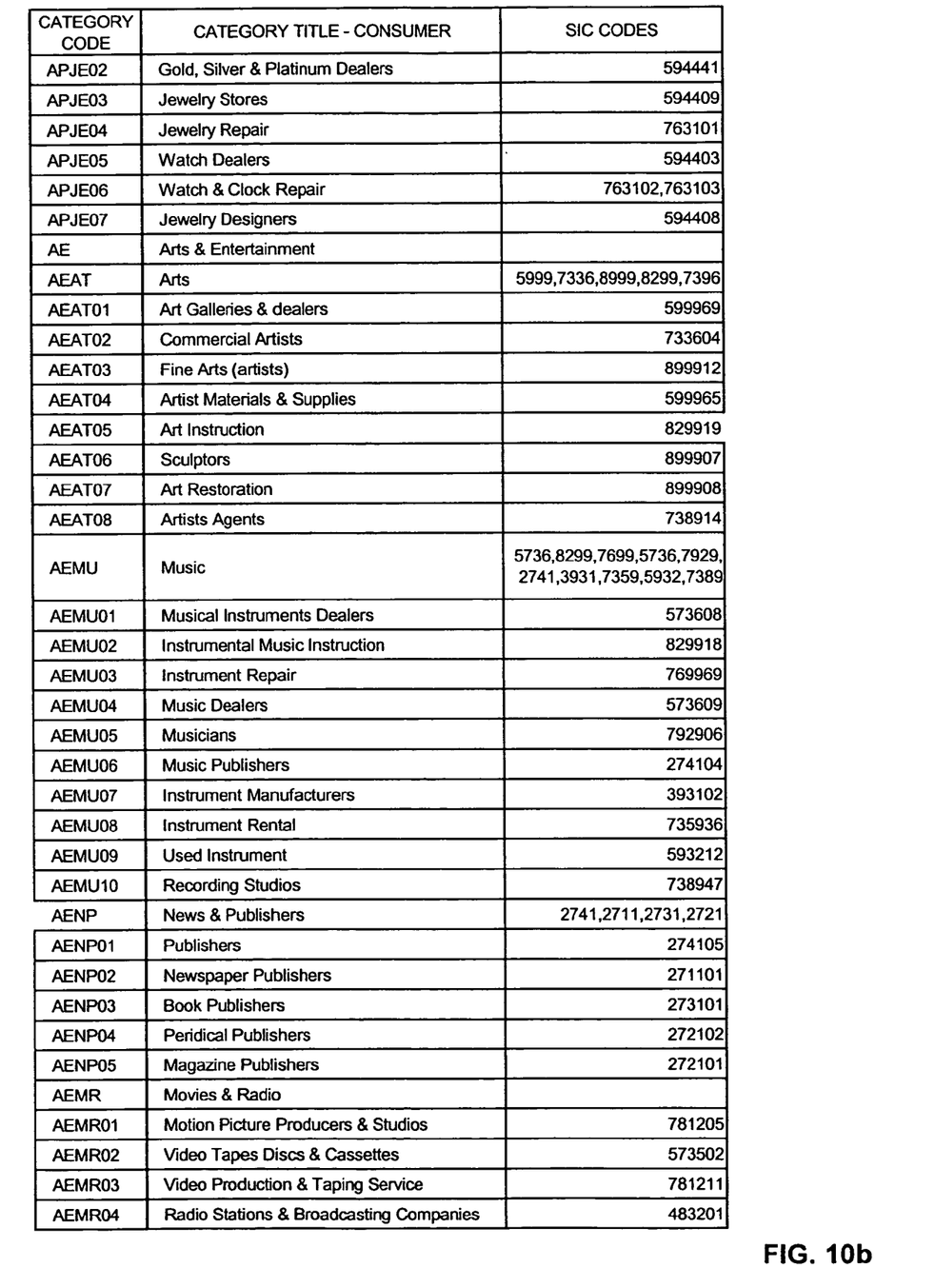

With reference to FIGS. 4-5, example embodiment 500 is now described in connection with a procedure 1000. A category file 502 is maintained that defines a hierarchical categorical structure of SIC codes (step 1010). As shown in an example in FIG. 10, the category file has at least a top level of broad subject matter categories, and may also have lower levels of subcategories. Each category and subcategory is associated with a respective set of SIC codes.

Figure 6:
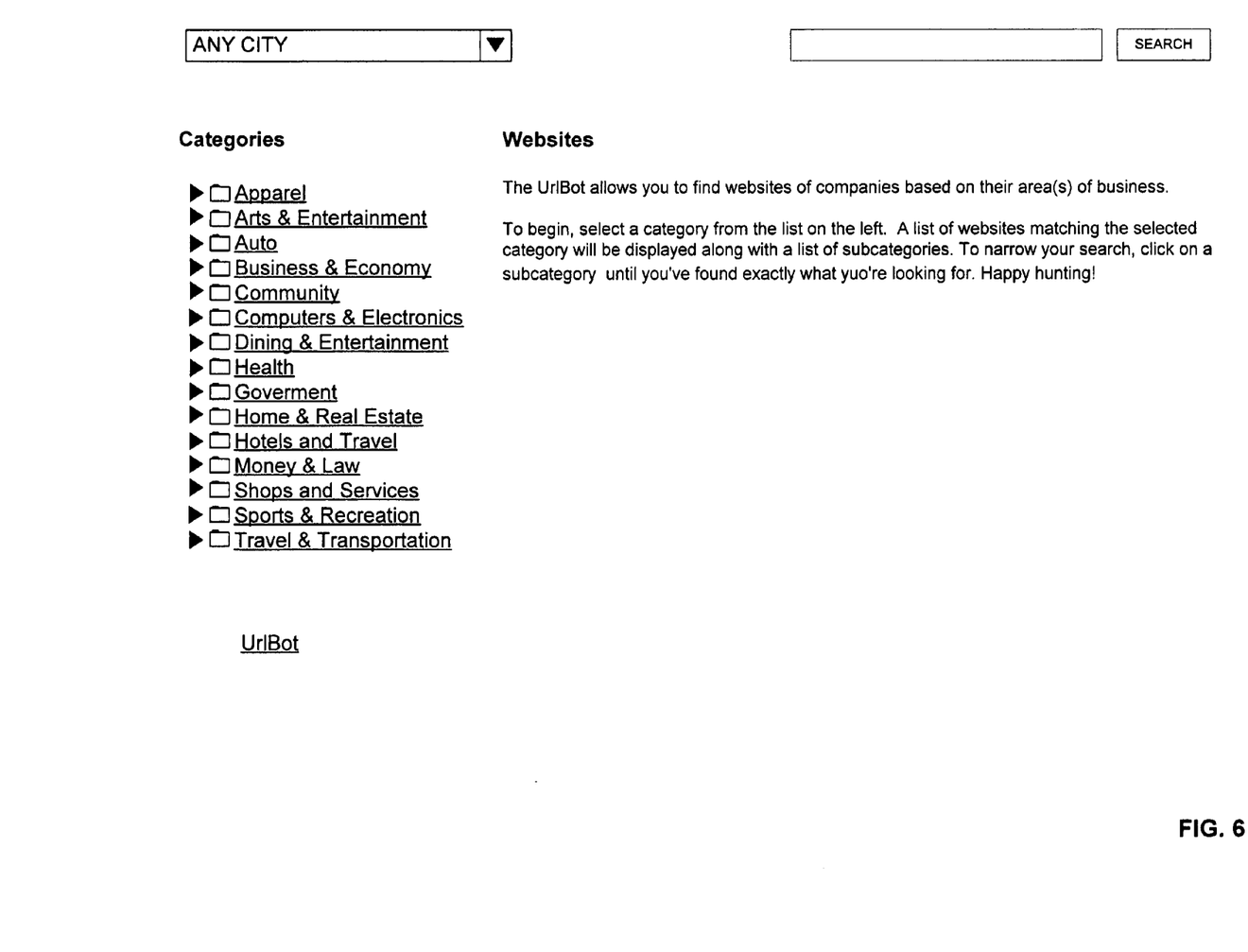
FIGS. 6-7 are illustrations of output produced by software.

A top level directory view is presented (step 1020). The top level directory view lists each of the categories in the top level, and may also allow the user to specify geographical criteria for a geographical filter, which filter is used as described below. FIG. 6 illustrates an example of a top level directory view.

The user is allowed to select a lowest level category or subcategory (step 1030). If there are no subcategories, a top level category may serve as the lowest level category. Otherwise, the user can burrow down through one or more levels of subcategories until one of the lowest level subcategories is reached. The lowest level category is selected by one or more mouse clicks or other user entry, and hierarchical views showing categories and subcategories are presented as necessary to help the user navigate.

It is determined, from the category file, which SIC codes are associated with the lowest level category that was selected ("selected SIC codes") (step 1040).

The entity information database is searched to acquire information indicating which entities match the selected SIC codes ("selected entities") (step 1050). The selected entities information may identify the selected entities by their respective unique IDs.

Figure 7:
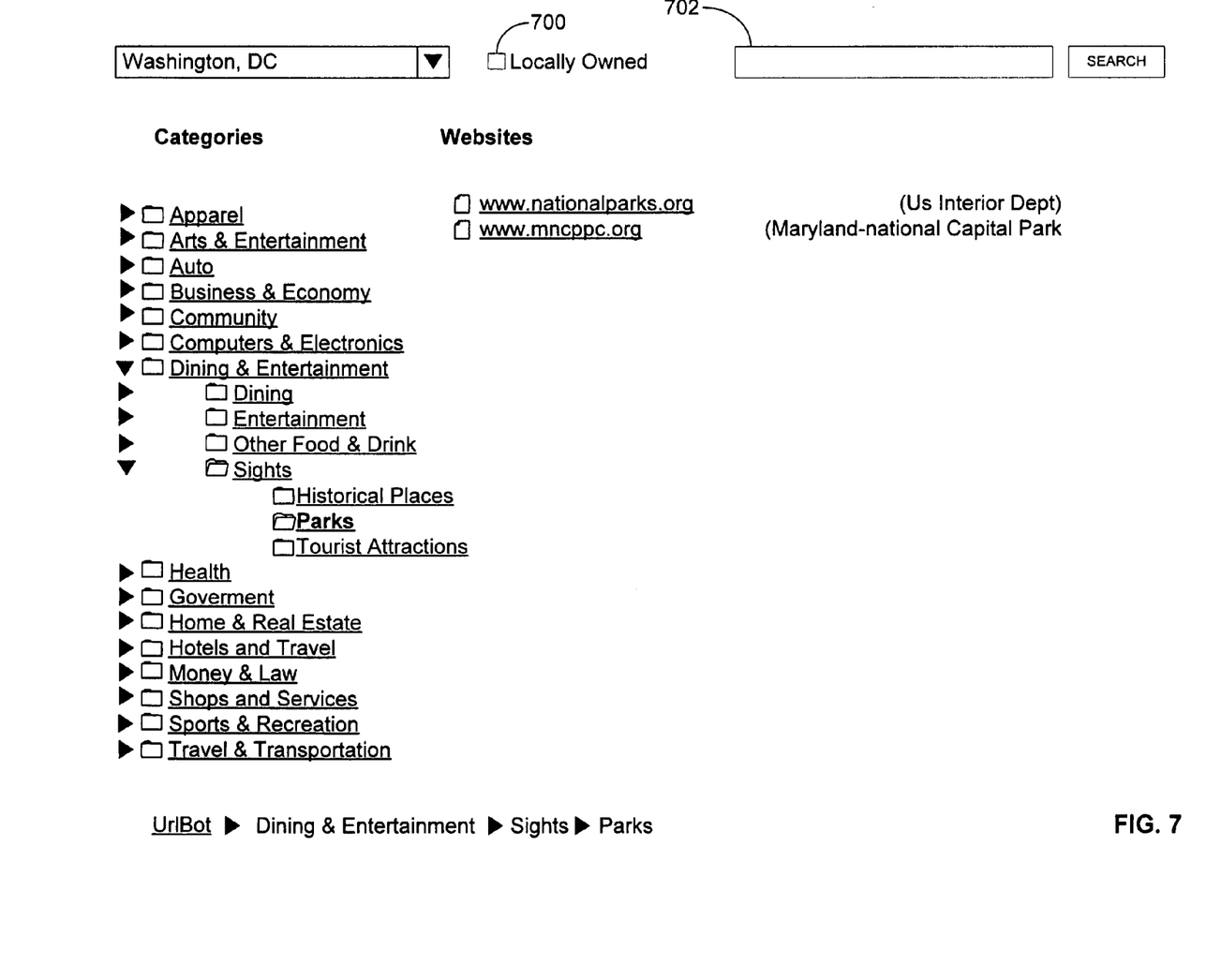

A view 504 is presented in which the selected entities are listed under the selected lowest level category (step 1060). As the selected entities are listed, the mapping database is searched to determine URLs for Web sites that are under the control of the selected entities ("selected URLs") (step 1070), and the selected URLS are listed together with the respective selected entities (step 1080). FIG. 7 illustrates an example of view of the list of the selected entities. From the view, the user can retrieve a page from a selected entity's Web site by selecting the respective selected URL (e.g., "www.nationalparks.org"), and can retrieve information about the entity from the entity information database by selecting the name of the entity in the list (e.g., "US Interior Dept").

In alternative embodiments, before or as the view of the list of the selected entities is presented, the selected entities are filtered, e.g., to filter out selected entities that do not match geographical criteria specified by the user (step 1090), or that are indicated in the mapping database as having control over no Web sites (step 1100). The geographical filter may be implemented by including the geographical criteria with the selected SIC codes when the entity information database is searched to determine selected entities. For example, if the user's geographical criteria specify a city, the only entities that are included in the view of the list of the selected entities are entities that are indicated in the entity information database as having a primary or secondary address in the city. In the user's geographical criteria, the presence may be required to be a primary address, and the directory application may allow this requirement to be selected by an input selection prompt such as box 700 of FIG. 7.

The directory application or another application such as a search engine may keep track of the number of times a Web site is accessed (i.e., the site's popularity), and may sort the list of selected entities by the number of times the Web sites under the control of the respective entities have been accessed, or the category file may be structured to group entities by the number of times their web sites have been accessed.

Multiple directory applications based on different category files may draw information from the same mapping database and the same entity information database, and thereby may be updated effectively instantaneously and simultaneously as the mapping and entity information databases are updated. For example, a first directory application may be provided to group entities by SIC codes as described above, and a second directory application may be provided to group entities by relationship to medical specialties or other professional specialties. In such a case, if the mapping database is updated to reflect that a medical office has made a change to the Web address of the Web site that is under the control of the medical office, the change is included in any views that are subsequently presented by the first and second directory applications and that list the medical office as a selected entity.

Figure 8:
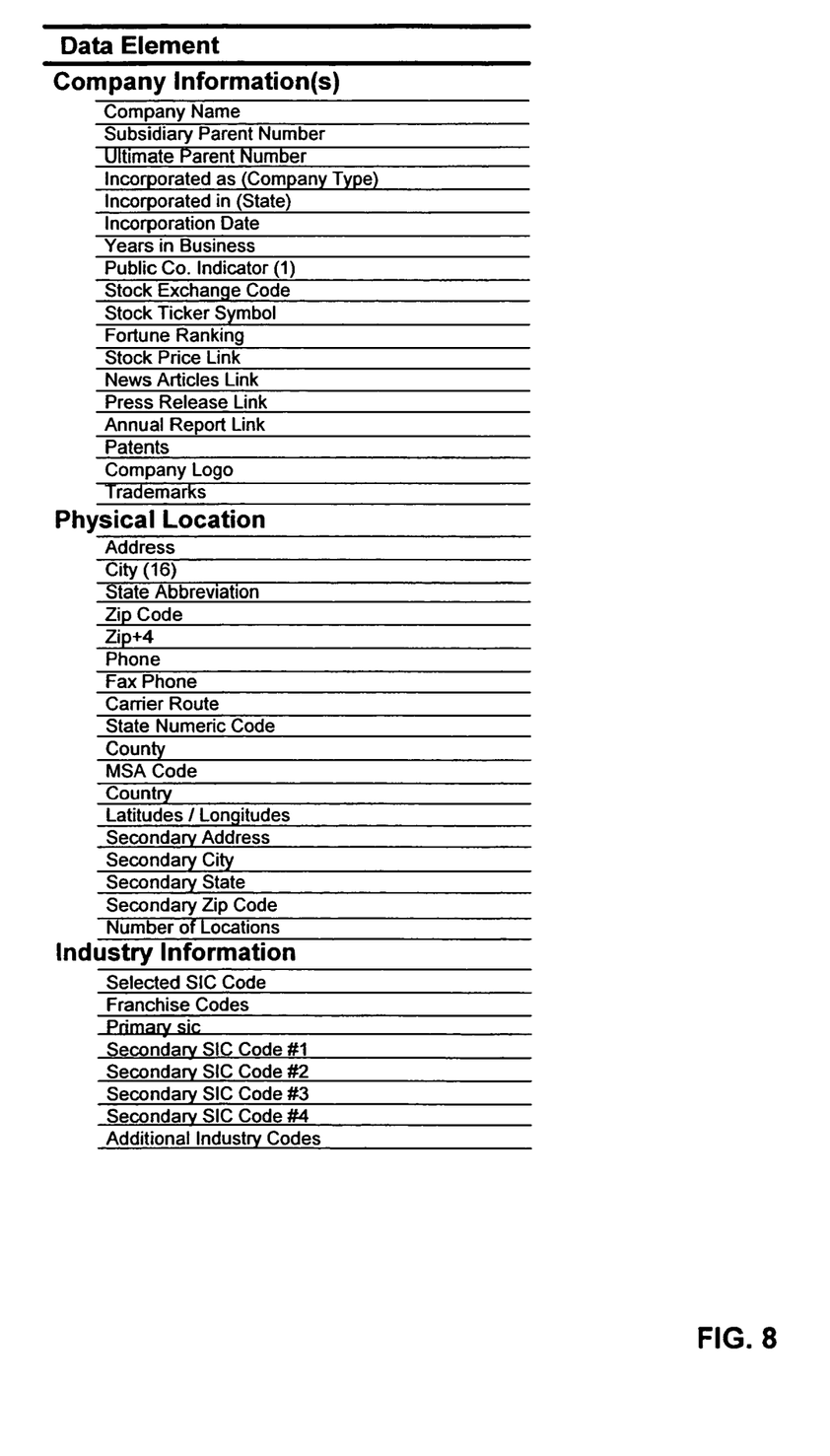
FIGS. 8-9 are illustrations of database information.
Figure 9A:
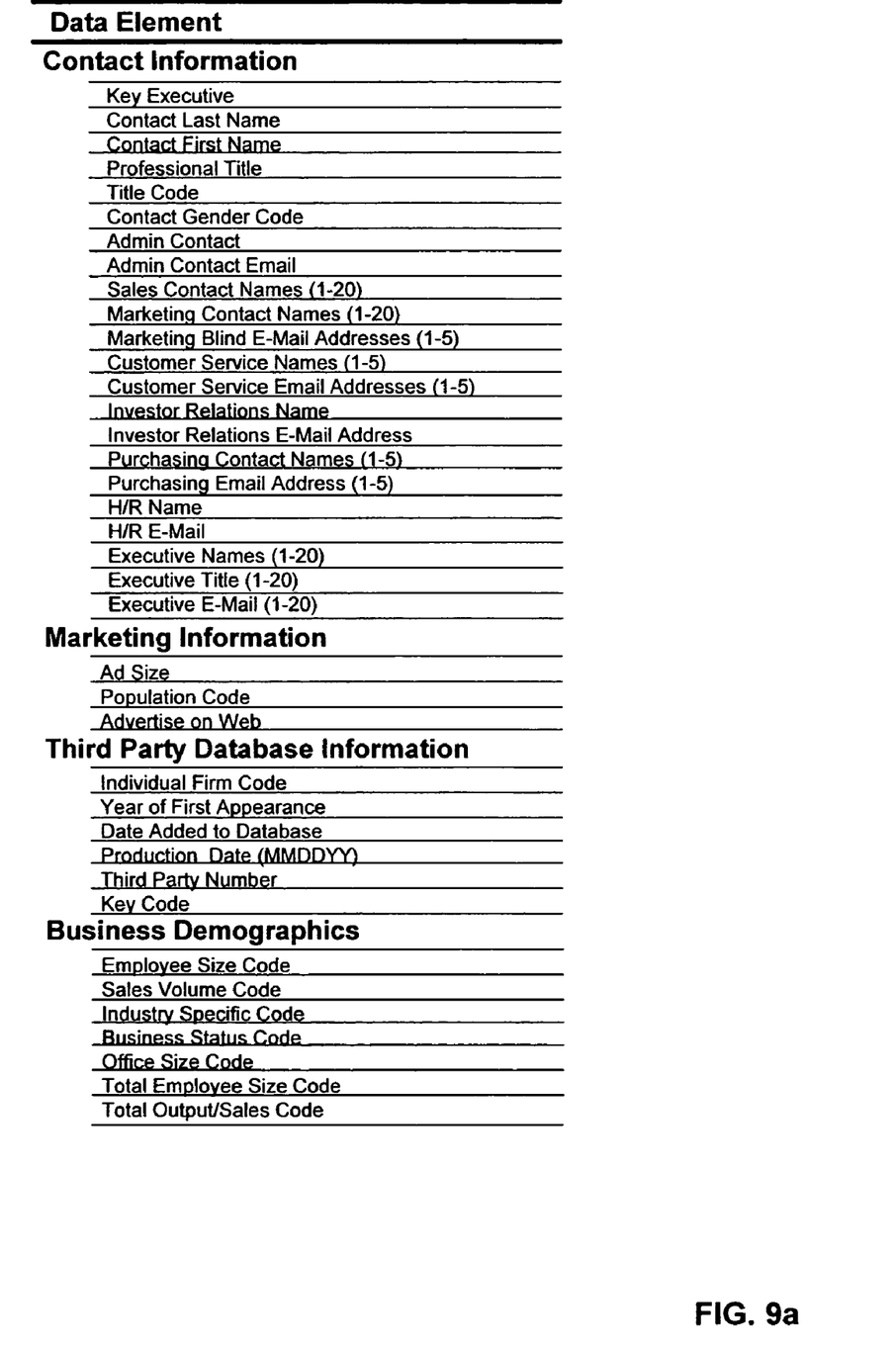
Figure 9B:
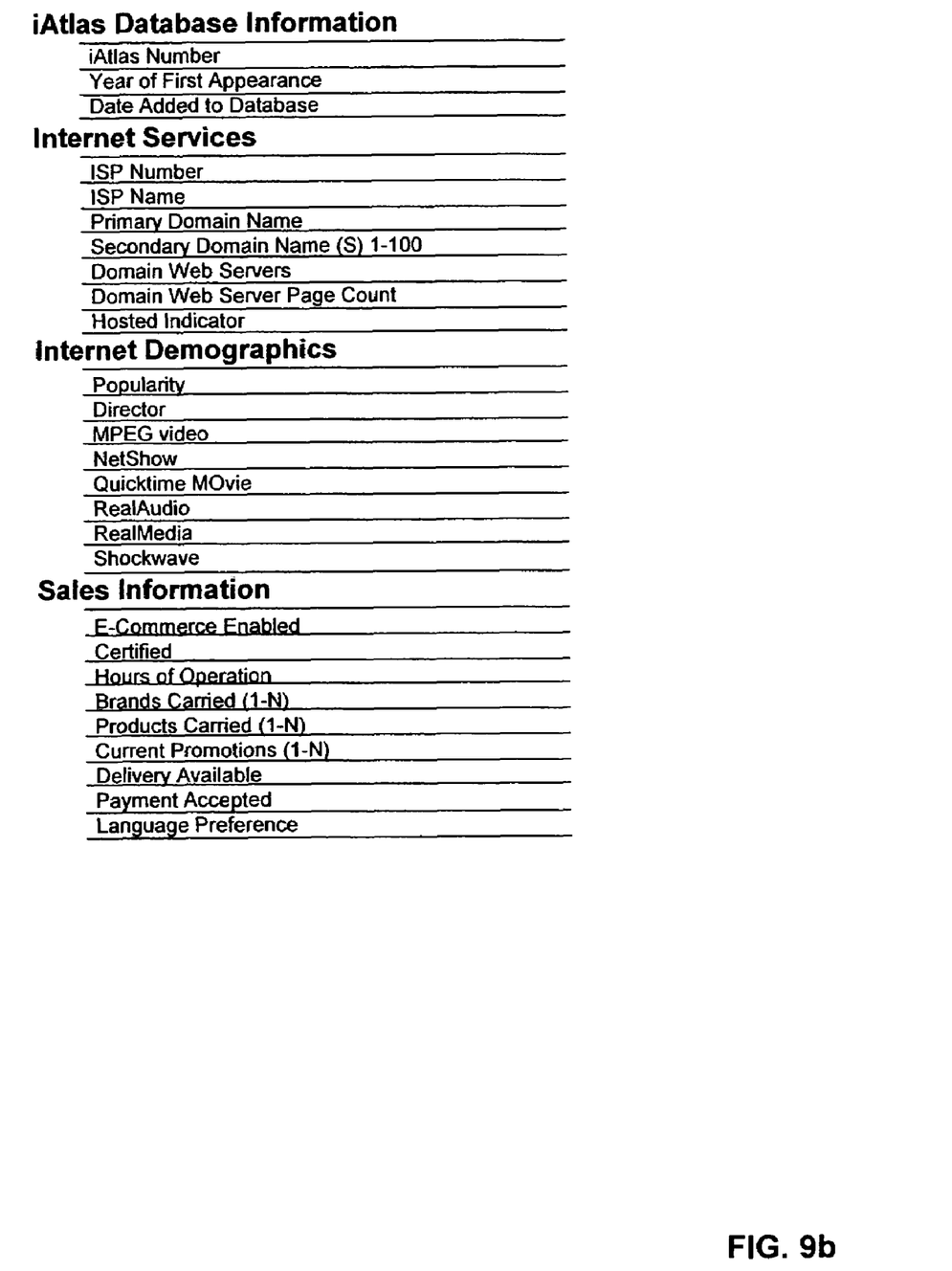

Other information that may be used in a category file to group entities includes brands of goods or services that may be offered by or through entities, and information listed in FIGS. 8-9 that illustrate an example of information that may be stored in the entity information database for each entity.

The user may also be permitted, in accordance with an input mechanism such as box 702 of FIG. 7, to execute a Web site search limited to Web sites identified by the selected URLs. Such a search may be accomplished by directing search engine 22 (FIG. 2) to search Web page record database 24 and then filtering out of the search results any records that do not include at least one of the selected URLs. Alternatively, if the records in the Web page record database have been tagged with unique IDs corresponding to entities, such a search may be accomplished by retrieving, from the entity information database, the unique IDs for the selected entities ("selected unique IDs"), and directing the search engine to return only records that are tagged with one or more of the selected unique IDs.

Any of many different types of computer equipment may be used. For example, one or more Intel-based personal computers may be used that run an SQL database on Linux and one or more programs written in Perl or the C programming language with interfaces to the SQL database.

The technique (i.e., the procedures described above) may be implemented in hardware or software, or a combination of both. In at least some cases, it is advantageous if the technique is implemented in computer programs executing on one or more programmable computers, such as a personal computer running or able to run an operating system such as Unix, Linux, Microsoft Windows 95, 98, or NT, or MacIntosh OS, that each include a processor, a storage medium readable by the processor (including volatile and non-volatile memory and/or storage elements), at least one input device such as a keyboard, and at least one output device. Program code is applied to data entered using the input device to perform the technique described above and to generate output information. The output information is applied to one or more output devices such as a display screen of the computer.

In at least some cases, it is advantageous if each program is implemented in a high level procedural or object-oriented programming language such as Perl, C, C++, or Java to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or optical or magnetic disc, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the user may be a human being or a non-human entity such as a computer program or an automated device that may interact with one or more of the databases or one or more of the applications via an application programming interface ("API") or a network message. An on-line information store or multiple databases may serve as the entity information database, which may take the form of any mechanism that provides automated access to information, such as a spreadsheet file or a store of email messages.

What is claimed is:

1. A system for providing a user with at least one response to a search query of the Internet, the system comprising:
    a user interface, the user interface effective to receive a search query from a user, wherein the search query includes one or more selected Standard Industrial Classification (SIC) codes and geographic criteria for filtering at least one URL responsive to the one or more selected SIC codes based on the geographic criteria, in which the geographic criteria is a city;
    a web page record database connected to the user interface, the web page record database including a plurality of web page records, the plurality of web page records including a response to the search query;
    a search engine module connected to both the user interface and the web page record database, the search engine module effective to search the web page record database for the response;
    an entity information database including information about individuals or organizations that maintain ownership over one or more web page records; and
    a mapping database connected to the web page record database and the entity information database, the mapping database including one or more unique type identifiers associated with the selected SIC codes for mapping the web page records with respective individuals or organizations.

2. The system as recited in claim 1, wherein the mapping database uses American Business Information Numbers.

3. The system as recited in claim 1, wherein the entity information database includes geographic information about the individuals or organizations.

4. The system as recited in claim 1, wherein the entity information database uses SIC fields.

5. The system as recited in claim 1, wherein the mapping database maps particular individuals or organizations to a plurality of web page records.

6. The system as recited in claim 1, wherein the entity information database includes information about one or more companies and their financial profiles information.

7. A method for providing a user at least one response to a search query of the Internet, the method comprising:
    providing a mapping database connected to a web page record database and a entity information database, the mapping database including one or more unique type identifiers associated with SIC codes for mapping the web page records with respective individuals or organizations;
    receiving a search query from a user, wherein the search query includes one or more selected Standard Industrial Classification (SIC) codes and geographic criteria for filtering at least one URL responsive to the one or more selected SIC codes based on the geographic criteria, in which the geographic criteria is a city;
    searching a web page record database for a response to the search query;
    mapping the response to an individual or organization associated with the response, wherein the individual or organization maintains ownership over one or more web page records; and
    displaying the response and a name of the individual or organization to the user.

8. The method of claim 7 wherein the search query is based on a hierarchical category structure.

9. The method as recited in claim 7, wherein the mapping uses American Business Information Numbers.

10. The method as recited in claim 7, further comprising displaying geographic information about the individual or organization.

11. A method for providing a user with at least one response to a search query of the Internet, the method comprising:
    maintaining a mapping database connected to a web page record database and a entity information database, the mapping database including one or more unique type identifiers associated with SIC codes for mapping the web page records with respective individuals or organizations;
    receiving a search query from a user in the form of category selection, wherein the search query includes one or more selected Standard Industrial Classification (SIC) codes and geographic criteria and the method further comprises filtering the at least one URL responsive to the one or more selected SIC codes based on the geographic criteria before performing the displaying, in which the geographic criteria is a city;
    determining at least one individual or organization associated with the search query;
    determining at least one URL under the ownership of the individual or organization; and
    displaying the URL to the user.

12. The method as recited in claim 11, wherein the determining at least one individual or organization is performed through the use of SIC codes.

13. The method as recited in claim 11, wherein the category selection comes from a hierarchical category structure.

14. The method as recited in claim 11, wherein the at least one URL includes a plurality of URLs and the plurality of URLs are displayed to the user in an order of popularity.

15. The method as recited in claim 11, further comprising displaying a name of the individual or organization.

16. The method as recited in claim 11, wherein the displaying includes displaying a plurality of URLs and the method further comprises enabling the user to execute a search in only the plurality of URLs.

* * * * *